(12) United States Patent
Ersoy et al.

(10) Patent No.: US 8,555,722 B2
(45) Date of Patent: Oct. 15, 2013

(54) METHOD AND APPARATUS FOR UNDERGROUND LINE CROSSING DETECTION

(75) Inventors: Daniel Allen Ersoy, Lincolnwood, IL (US); Christopher Ziolkowski, Elmhurst, IL (US)

(73) Assignee: Gas Technology Institute, Des Plaines, IL (US)

( * ) Notice: Subject to any disclaimer, the term of this patent is extended or adjusted under 35 U.S.C. 154(b) by 882 days.

(21) Appl. No.: 12/561,649

(22) Filed: Sep. 17, 2009

(65) Prior Publication Data

US 2011/0061463 A1    Mar. 17, 2011

(51) Int. Cl.
*G01H 1/12*    (2006.01)
(52) U.S. Cl.
USPC .............................................. 73/592; 367/119
(58) Field of Classification Search
USPC ....... 73/584, 592, 594, 597, 40.5 A; 367/119; 324/76.39
See application file for complete search history.

(56) References Cited

U.S. PATENT DOCUMENTS

| | | | | |
|---|---|---|---|---|
| 4,911,012 A * | 3/1990 | Ziska | ............................... | 73/584 |
| 5,194,816 A * | 3/1993 | Steele | ........................... | 324/529 |
| 5,531,099 A * | 7/1996 | Russo | ....................... | 73/40.5 A |
| 5,672,825 A * | 9/1997 | Uno et al. | ........................ | 73/579 |
| 6,003,376 A | 12/1999 | Burns et al. | | |
| 6,051,977 A * | 4/2000 | Masuda et al. | ................. | 324/529 |
| 6,614,354 B2 * | 9/2003 | Haines et al. | .................. | 340/605 |
| 6,679,120 B1 * | 1/2004 | Cribbs et al. | .................... | 73/598 |
| 2012/0043960 A1 * | 2/2012 | Huebler | ..................... | 324/76.39 |

OTHER PUBLICATIONS

"A Quick Course on Magnetic, Cable and Pipe Locating", Schonstedt Instrument Company, Feb. 2003, pp. 1-45.
Alleyne, D.N. et al., "The Choice of Torsional or Longitudinal Excitation in Guided Wave Pipe Inspection", Insight, vol. 51, No. 7, Jul. 2009.

* cited by examiner

*Primary Examiner* — Peter Macchiarolo
*Assistant Examiner* — Rose M Miller
(74) *Attorney, Agent, or Firm* — Pauley Petersen & Erickson

(57) ABSTRACT

A method and apparatus for detecting contact between an underground electric wire conduit and an underground utility pipeline in which a detectable signal is applied to an electric line wire disposed within the underground electric wire conduit and the underground utility pipeline is monitored for a presence of the detectable signal. When there is a contact between the underground electric wire conduit and the underground utility pipeline, the signal applied to the electric line wire is detected by a suitable signal detector disposed on the surface of the utility pipeline and/or within the utility pipeline.

15 Claims, 11 Drawing Sheets

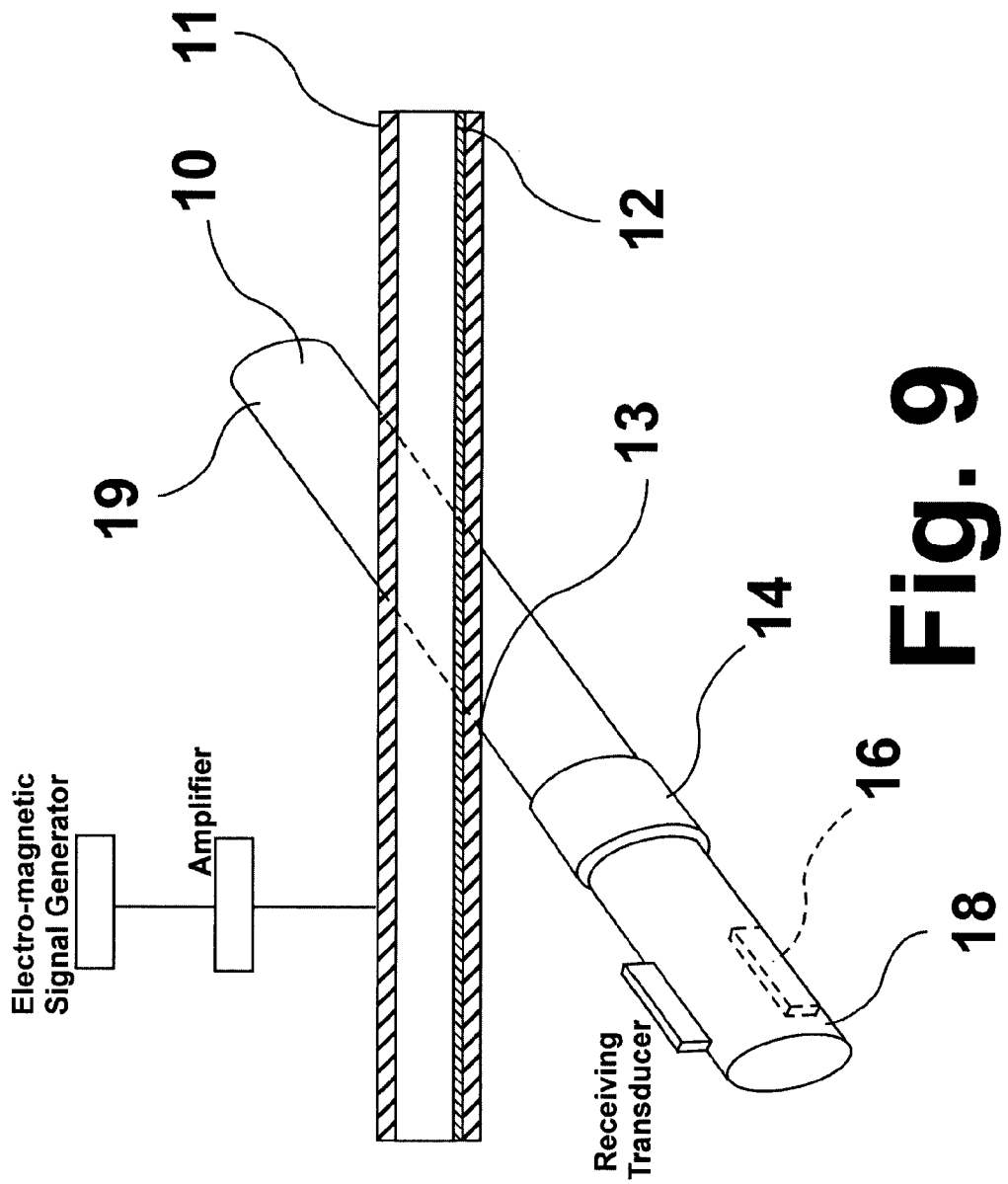

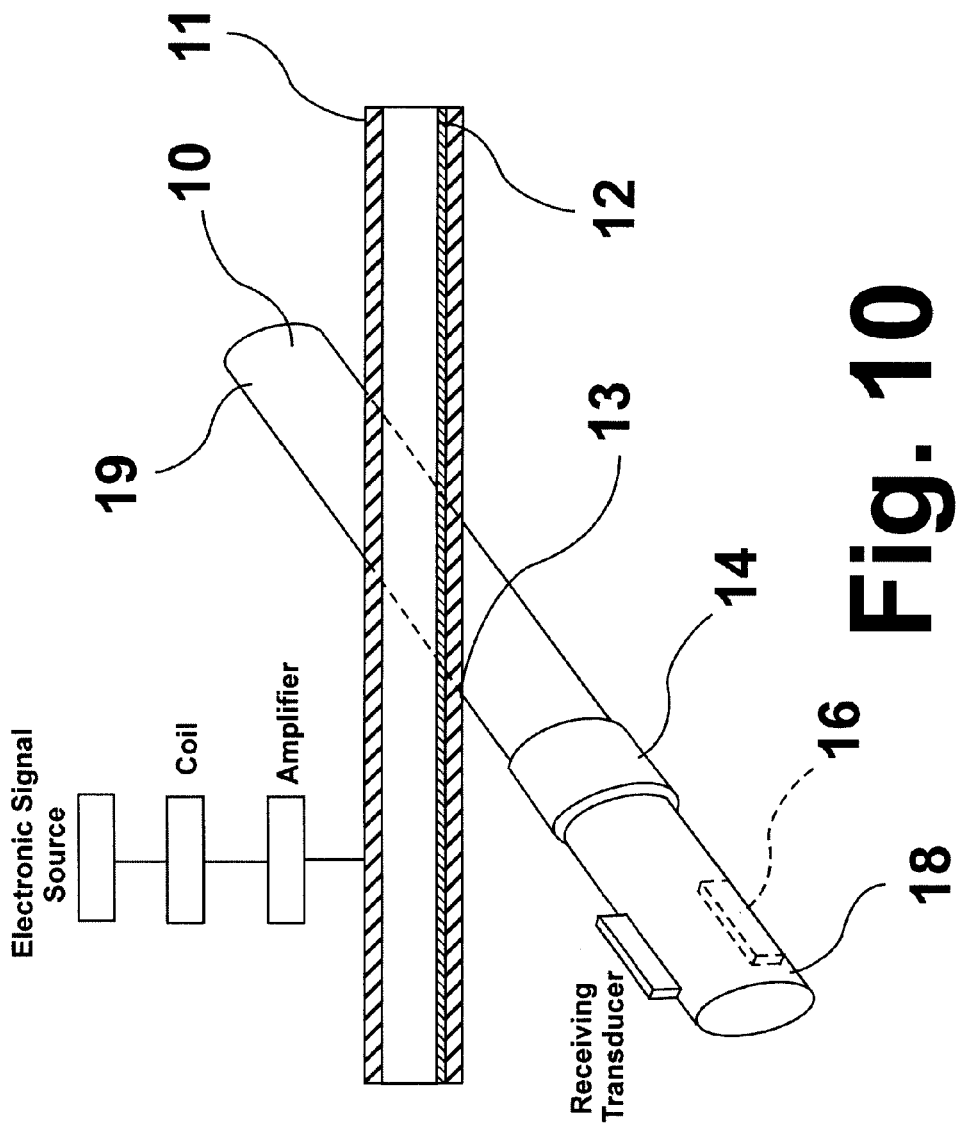

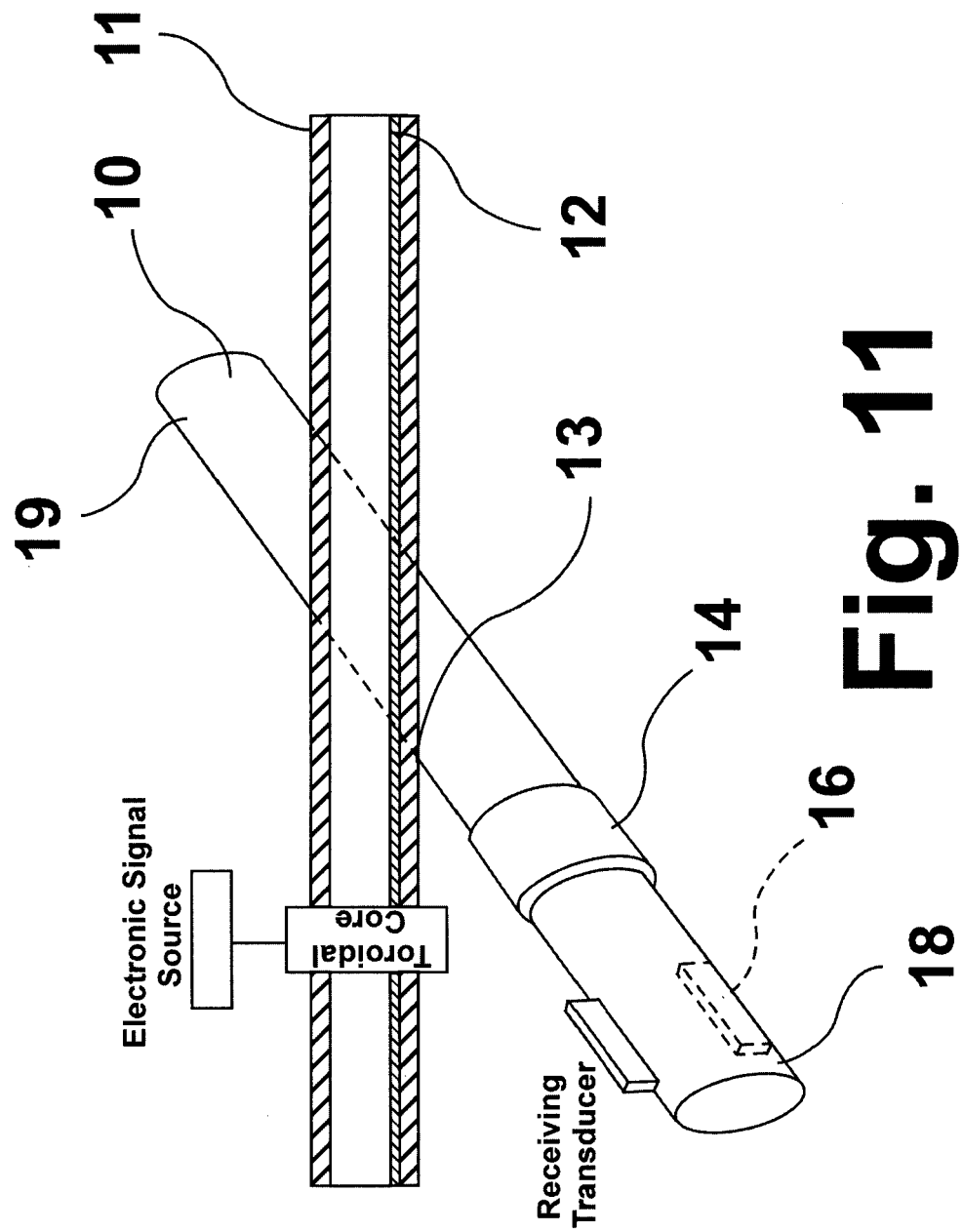

METHOD AND APPARATUS FOR UNDERGROUND LINE CROSSING DETECTION

BACKGROUND OF THE INVENTION

1. Field of the Invention

This invention relates to a method and apparatus for determining the existence and location of a contact between an underground electric wire conduit and an underground utility pipeline.

2. Description of Related Art

When an underground electric wire conduit containing one or more electric line wires crosses an underground utility pipeline, such as a natural gas pipeline, there are several potential events which may occur that result in the release of gas and a potential incident and/or explosion. If the electric wire conduit is in physical contact with the underground utility pipeline, then a shorting situation can occur. This will usually happen when one of the electric line wires, which are typically copper with insulation, within the electric wire conduit shorts to the conduit, which is typically made of metal, but which may also be made of concrete or plastic. In the case of a metal conduit, when one of the copper wires shorts to the conduit, the conduit itself can carry the current and voltage because it is also a conductor. This can also be the case with concrete conduits as well because they can conduct electricity under certain conditions. If the metal conduit is in physical contact with the underground utility pipeline, which is typically steel or other metallic conductor, then the current can "flow" to the pipeline, which can act as a "ground". When this happens, there is usually an arcing situation between the electric wire conduit and the pipeline which, if allowed to go unchecked, will most likely result in a hole being formed in both the conduit and the pipeline, thereby releasing gas from the pipeline from which an explosion may follow. It is, thus, highly desirable to be able to locate these contact points between the conduit and the pipeline before there is a short of the wires to the conduit leading to arcing, gas release and explosion.

Potential solutions to this problem include ground penetrating radar and electromagnetic or acoustic pipe locators. However, these techniques do not provide the accuracy in the depth direction to determine whether or not there is a physical contact between the underground electric wire conduit and the underground utility pipeline. In addition, with both of these techniques, the operator must be either directly above or very close to the point of contact.

Placing an electrical or electromagnetic signal on either the pipeline or the electric wire conduit and then using a receiver on the pipeline to detect a physical contact between the conduit and the pipeline may not be possible because the pipeline may have individual pipeline sections connected by electrically-insulating mechanical couplings. As a result, the pipelines may not be electrically continuous and can severely attenuate an electrical or electromagnetic signal down their entire length, in addition to which the electric wire conduit also may not be electrically continuous.

SUMMARY OF THE INVENTION

Accordingly, it is one object of this invention to provide a method and apparatus or system for determining the existence and location of a physical contact between an underground electric wire conduit and an underground utility pipeline.

It is another object of this invention to provide a method and apparatus or system for determining the existence and location of a physical contact between an underground electric wire conduit and an underground utility pipeline which is effective notwithstanding the lack of electrical continuity within either the pipeline or the electric wire conduit.

This invention takes advantage of those elements within the electric wire conduit/utility pipeline system which are electrically and physically continuous, namely the electric line wires. Accordingly, the above objects as well as other objects of this invention are addressed by a method and apparatus for detecting contact between an underground electric wire conduit and an underground utility pipeline in which a detectable signal is applied, directly or indirectly, to an electric line wire disposed within the underground electric wire conduit and the underground utility pipeline is monitored for a presence of the detectable signal. When there is a contact between the underground electric wire conduit and the underground utility pipeline, the signal applied to the electric line wire is detected by a suitable signal detector disposed on the surface of the utility pipeline and/or within the utility pipeline.

The apparatus for detecting contact between an underground electric wire conduit and an underground utility pipeline in accordance with the method of this invention comprises electronic signal generation means for electronically generating a signal that may then be applied to the underground electric wire conduit by means of a suitable transducer that is specific to the form or type of signal generated. The electronic signal may take any of a number of forms including continuous sinusoids, continuous square or triangle waves, or discontinuous pulses. The apparatus further comprises electronic receiving means for electronically receiving and identifying the signal that has been acquired from the underground utility pipeline by means of a suitable transducer that is specific to the form or type of signal acquired. The apparatus further comprises injection means for imparting the electronically generated signal onto the underground electric wire conduit in a manner that propagates the signal along the conduit and extraction means for extracting the signal from the pipeline for the purposes of detection.

BRIEF DESCRIPTION OF THE DRAWINGS

These and other objects and features of this invention will be better understood from the following detailed description taken in conjunction with the drawings, wherein:

FIG. 9 is a schematic diagram showing a system for detecting contact between an underground electric wire conduit and an underground utility pipeline in accordance with one embodiment of this invention showing the use of an electromagnetic signal generator;

FIG. 10 is a schematic diagram showing a system for detecting contact between an underground electric wire conduit and an underground utility pipeline in accordance with one embodiment of this invention showing the use of a coil for inducing a signal in the electric wire line conduit; and FIG. 11 is a schematic diagram showing a system for detecting contact between an underground electric wire conduit and an underground utility pipeline in accordance with one embodiment of this invention showing the use of a toroidal core for inducing a signal in the electric wire line conduit.

DETAILED DESCRIPTION OF THE PRESENTLY PREFERRED EMBODIMENTS

Figure 1:
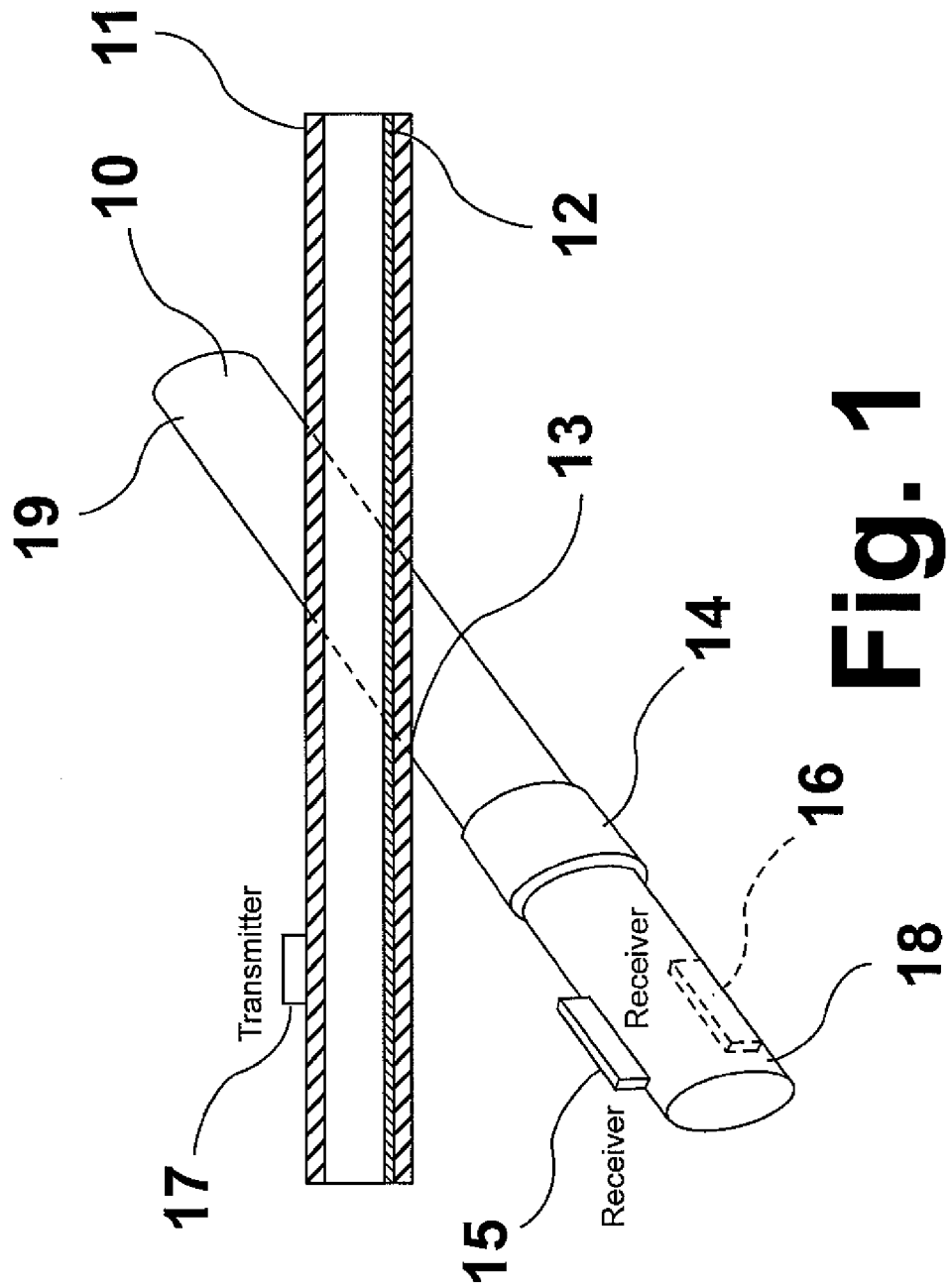
FIG. 1 is a schematic diagram showing the method for detecting contact between an underground electric wire conduit and an underground utility pipeline in accordance with one embodiment of this invention.
Figure 2:
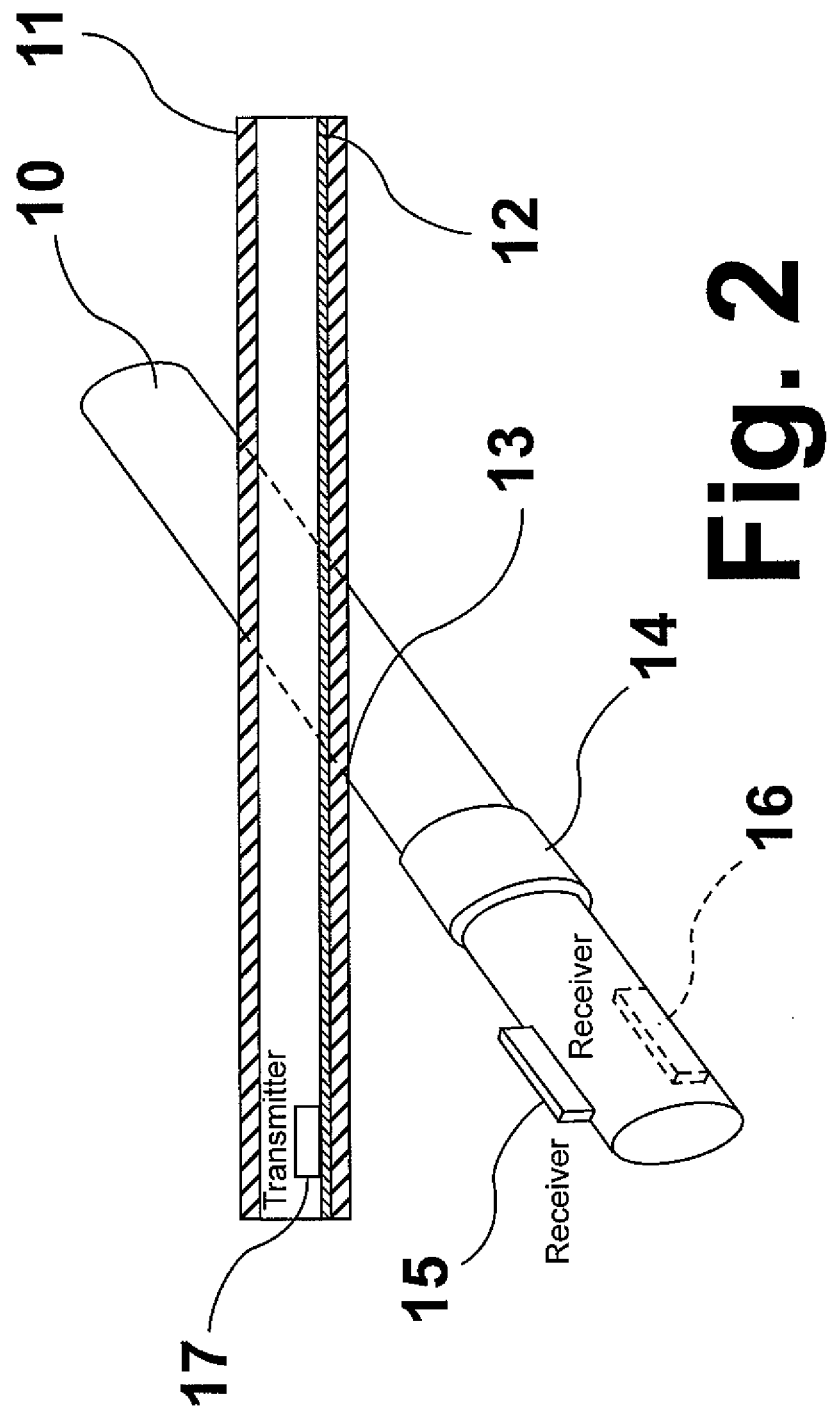
FIG. 2 is a schematic diagram showing a system for detecting contact between an underground electric wire conduit and an underground utility pipeline in accordance with another embodiment of this invention.
Figure 3:
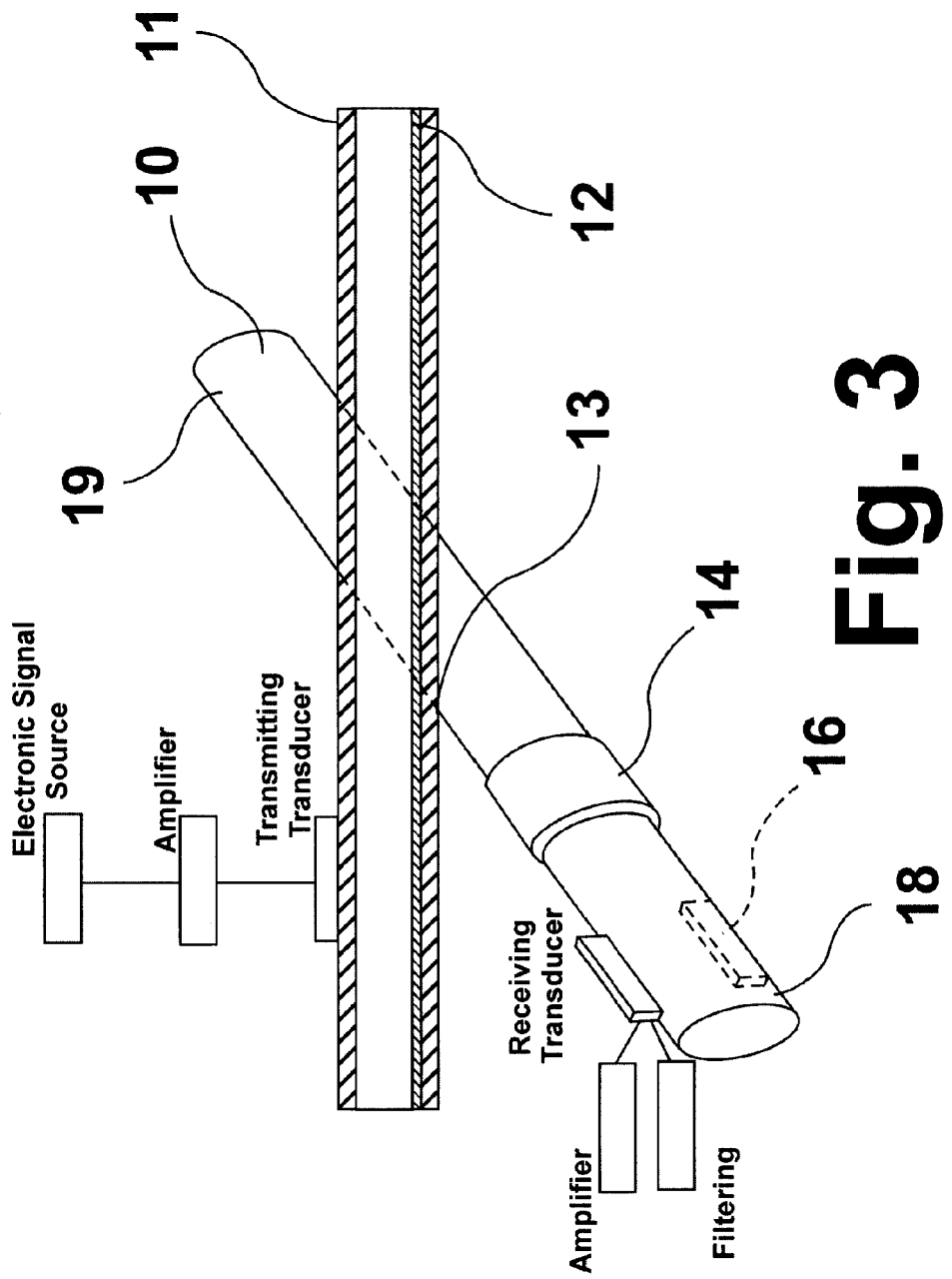
FIG. 3 is a schematic diagram showing a system for detecting contact between an underground electric wire conduit and an underground utility pipeline in accordance with one embodiment of this invention showing an electronic signal source, amplifiers, transmitting and receiving transducers and filtering.
Figure 4:
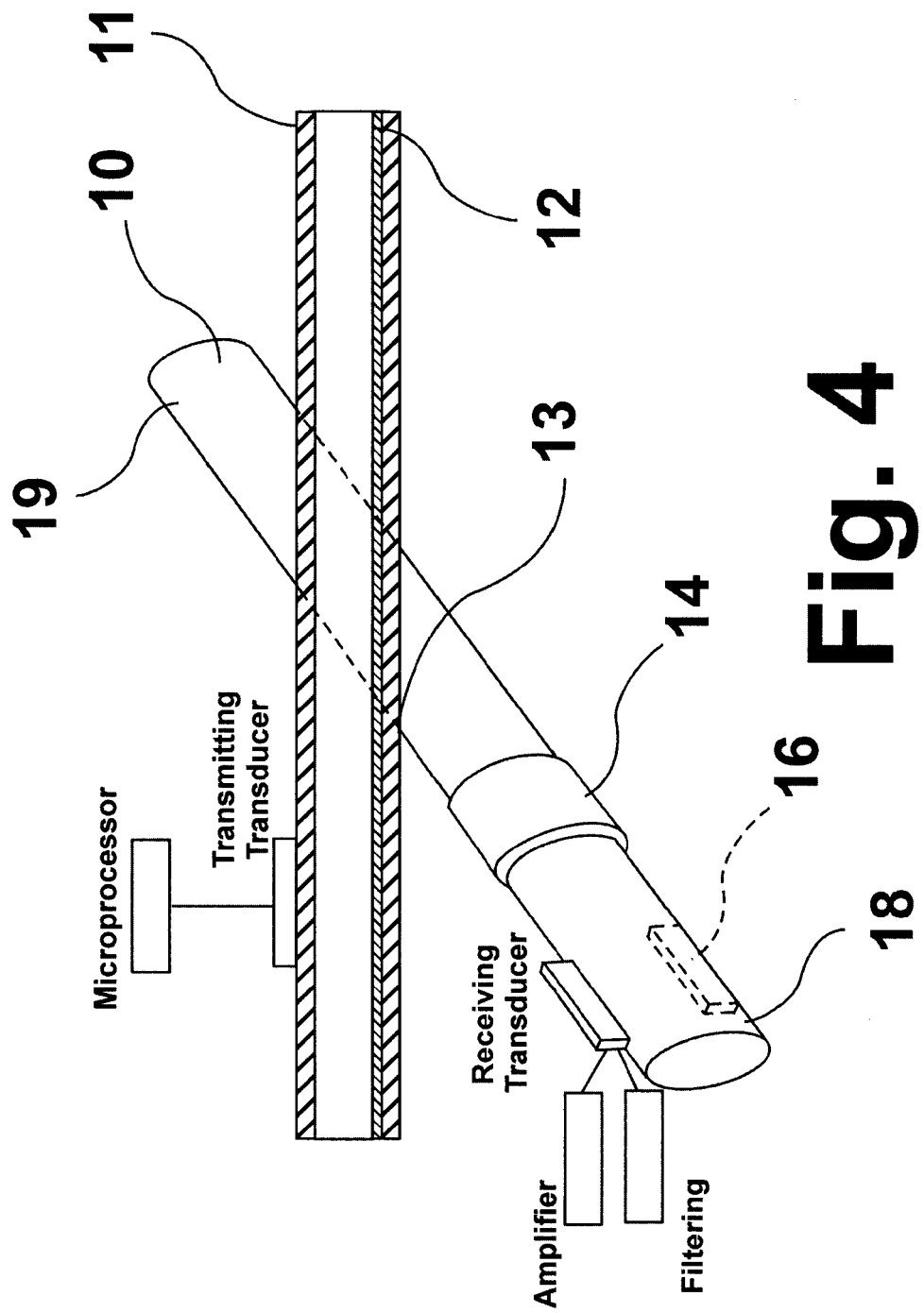
FIG. 4 is a schematic diagram showing a system for detecting contact between an underground electric wire conduit and an underground utility pipeline in accordance with one embodiment of this invention showing the use of a microprocessor as an electronic signal source.
Figure 5:
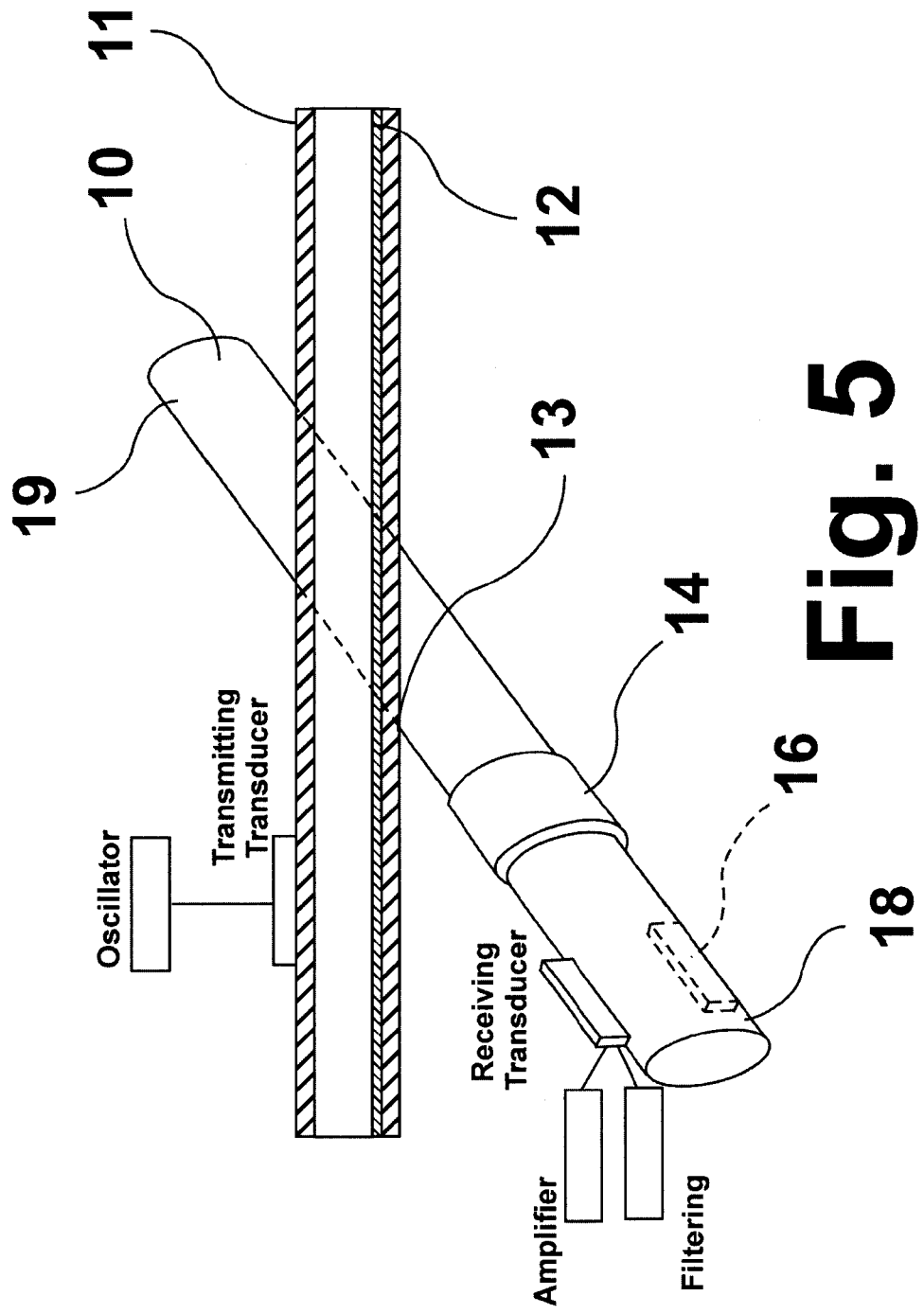
FIG. 5 is a schematic diagram showing a system for detecting contact between an underground electric wire conduit and an underground utility pipeline in accordance with one embodiment of this invention showing the use of an oscillator as an electronic signal source.
Figure 6:
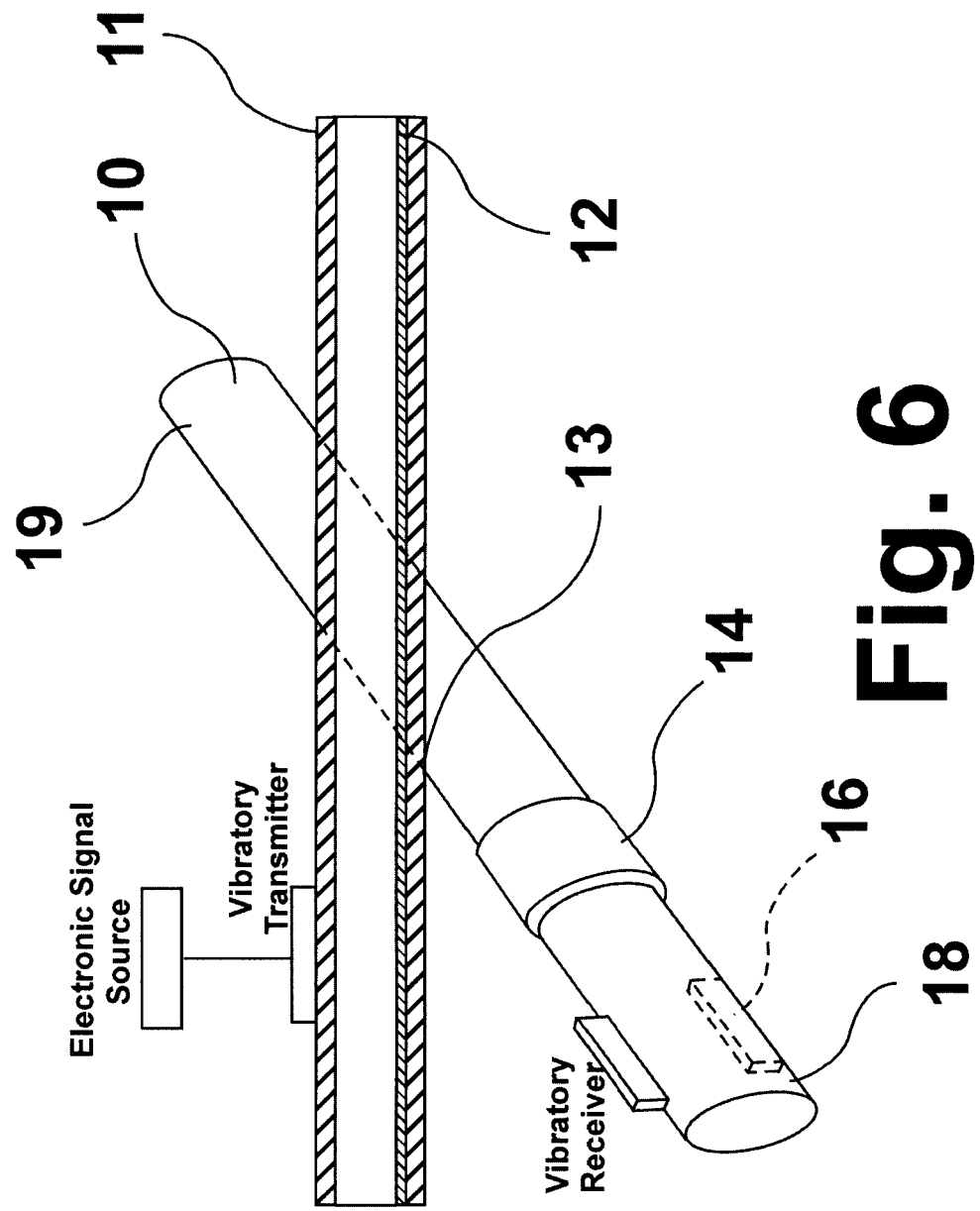
FIG. 6 is a schematic diagram showing a system for detecting contact between an underground electric wire conduit and an underground utility pipeline in accordance with one embodiment of this invention showing the use of a vibratory transmitter and vibratory receiver.
Figure 7:
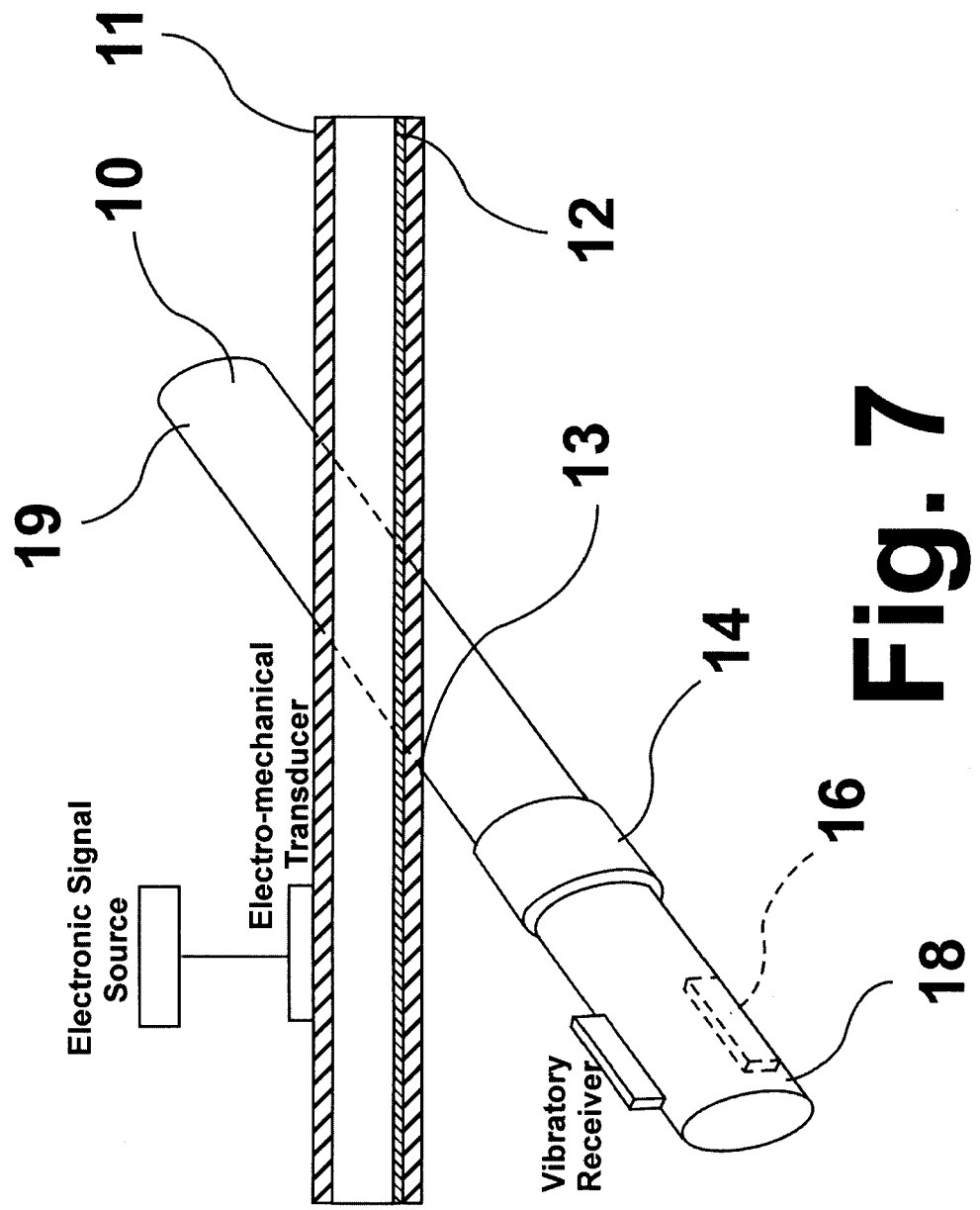
FIG. 7 is a schematic diagram showing a system for detecting contact between an underground electric wire conduit and an underground utility pipeline in accordance with one embodiment of this invention showing the use of an electromechanical transducer for generating a vibratory signal.
Figure 8:
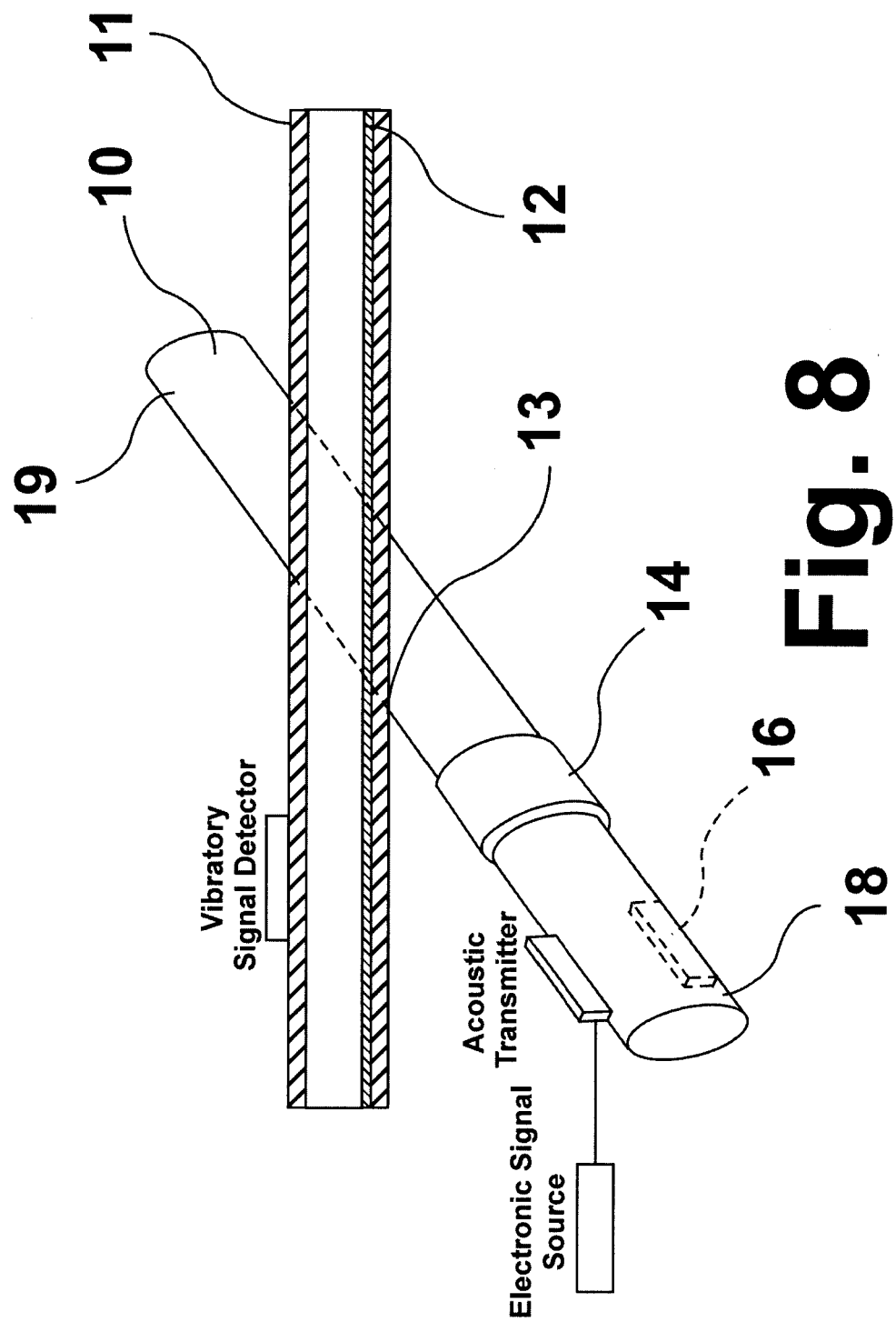
FIG. 8 is a schematic diagram showing a system for detecting contact between an underground electric wire conduit and an underground utility pipeline in accordance with one embodiment of this invention showing disposition of an acoustic transmitter on the pipe and a vibratory signal detector on an electric wire line conduit.

The invention disclosed herein is a method and system for determining the existence and location of crossings of, and contact between, an underground electric wire conduit and an underground utility pipeline. As used herein, the term "utility pipeline" refers to a pipeline through which a gaseous or liquid fluid, e.g. natural gas, petroleum oil, water, is transported. FIGS. 1 and 2 are diagrams showing a typical crossing between an underground electric line wire conduit 11 and an underground utility pipeline 10 comprising pipeline segments 18 and 19 connected together by coupling 14 to which the method and system of this invention may be applied. As shown therein, conduit 11, containing electric line wires 12, crosses over pipeline 10 such that a contact point 13 is established there between. As previously indicated, pipeline 10, which is typically metallic and, thus, an electrical conductor, may be limited in the distance over which electricity may be conducted by non-conductive fittings, such as coupling 14, which blocks or attenuates an injected electrical signal traveling down the electric line wire conduit to the utility pipeline for detection and confirmation of a contact situation or from the utility pipeline to the electric line wire conduit to check for the contact. Accordingly, the crux of this invention is to use the only available electrically and physically continuous element of the system as a vehicle for transmission of a suitable signal for detecting the existence and location of the contact point, i.e., the electric line wires 12 disposed within the electric line wire conduit 11; and the initial step of the method of this invention is the imparting of a detectable signal directly or indirectly onto the electric line wires, which detectable signal is, in turn, imparted onto the electric line wire conduit for transmission along the length of the conduit. Any contact between the electric line wire conduit and the utility pipeline will result in transfer of the detectable signal onto the utility pipeline. Thus, detection of the signal on the utility pipeline establishes the presence of a crossing point (and contact point) between the electric line wire conduit and the utility pipeline. If the detectable signal is not detected on the utility pipeline, there may be a crossing of the electric line wire conduit and the utility pipeline, but there is no contact there between and, thus, little, if any, cause for concern.

The apparatus for carrying out the method of this invention comprises electronic signal generation means for electronically generating a signal that is then imparted onto the underground electric wire conduit using a suitable transducer specific to the form of the signal generated. Specific embodiments described herein below are shown in FIGS. 3-11, inclusive. In accordance with one embodiment of this invention, in addition to a suitable transducer, the electronic signal generation means comprises an electronic signal source. As previously indicated, the electronic signal may take a variety of fundamental forms including, but not limited to, continuous sinusoids, continuous square or triangle waves, or discontinuous pulses. The signal may also be formed by electronically mixing these fundamental signals to optimize the ability to detect the contact between the underground electric wire conduit and the underground utility pipeline. Continuous signals may be generated using oscillators and more complex signals may be synthesized using microprocessor-based systems known to those versed in the art. In accordance with one embodiment of this invention, amplification and signal conditioning means for matching the electrical signal to the characteristics of the particular transmitting transducer employed in the apparatus are provided. In accordance with one embodiment of this invention, the amplification and signal conditioning means comprises a power amplifier disposed between and connected with the electronic signal source and a transmitting transducer of the electronic signal generation means to enhance the extent to which the signal propagates.

The apparatus for carrying out the method of this invention further comprises electronic signal detector means for electronically receiving and identifying the signal that has been acquired from the underground utility pipeline using a suitable receiving transducer specific to the form of the signal generated by the electronic signal generation means. In accordance with one embodiment of this invention, the receiving transducer is connected with an amplifier to raise the signal to a level appropriate for the detection and identification means to work effectively. Analog or digital filtering that is matched to the characteristics of the signal applied to the conduit may be used to differentiate the signal from background noise which may be present.

As shown in FIGS. 1 and 2, the detectable signal is generated by a transmitter 17 in communication with the electric line wire conduit 11 in such a manner so as to enable imparting of the detectable signal onto the electric line wire conduit, depending upon the type of detectable signal employed. It will be appreciated by those skilled in the art that separate transducers, i.e., transmitters 17 and receivers 15, 16 utilizing a "pitch-catch" arrangement, or a single transducer, i.e., a transceiver employing a "pulse-echo" arrangement, may be employed for generation and detection, respectively, of the detectable signal, and both types of systems are deemed to be within the scope of this invention.

In accordance with one embodiment of this invention, the detectable signal is an electro-magnetic signal, which may be used in situations involving small enough sections of electrical conduit and utility pipeline so as to ensure electrical continuity or, at a minimum, "impedance" continuity in the electrical conduit and the utility pipeline. There are two methods which may be employed for imparting an electro-magnetic signal onto the electric line wire conduit—the conductive method and the inductive method. For the conductive method, the electronic signal is directly connected with a ground and the conduit through a power amplifier. For the inductive method, a transducer that converts the electronic signal into a magnetic field is disposed proximate the conduit, i.e., in the vicinity of the conduit, such that when the transducer is powered on, a signal current is induced into the conduit. There are two typical magnetic transducers for inducing a signal into the conduit. A coil on the ground surface proximate to the conduit, when driven with the electronic signal, will generate a magnetic field that in turn induces a signal on the conduit. A toroidal core of magnetic material, having an appropriate coil wound on said core, can be disposed about the conduit. This toroidal transducer will induce a signal in the conduit when the coil is driven with the electronic signal. The toroidal transducer is often fabricated in the form of a hinged clamp that can easily be applied or removed from a conduit. The conductive and inductive means are substantially symmetrical in that they can both apply and extract electromagnetic signals from the conduit.

In each case, the conduit must have a ground along the conduit distal from the transducer to form a complete circuit path for the signal to follow. With any of these methods, because any signal applied to the conduit will leak off to ground, thereby getting weaker with distance from the transmitter, frequency is an important parameter for optimizing the signal along the conduit. Another factor affecting how fast the signal leaks off is soil conditions. Frequencies less than 1 kHz to 100 kHz and higher may be employed depending on the conditions proximate the conduit.

In accordance with one preferred embodiment of this invention, the electronic signal generation means comprises sound generation means for generating a vibratory signal. In accordance with one embodiment of this invention, the sound generation means comprises a detectable signal transmitter in the form of an acoustic, or vibratory, transmitter connected with the electric line wire conduit which converts the electrical signal into the vibration that is mechanically coupled to the pipe, thereby imparting a vibratory signal onto the conduit which, in turn, causes the electric line wire inside the conduit to vibrate. Examples of this type of electro-mechanical transducer are magnetic and piezoelectric devices. Magnetic transducers may be embodied in a loudspeaker, wherein the electrical signal energizes a coil to generate a varying magnetic field which interacts with the constant field of a permanent magnet. The interaction of the magnetic fields generates a varying mechanical force in proportion to the applied electrical signal. Piezoelectric transducers make use of materials that exhibit the property of changing their physical dimensions in the presence of an applied electric field. The piezoelectric material is arranged between two metallic electrodes to which the electrical signal is applied. The result is the electrical signal is converted to a mechanical force that causes the material between the electrodes to expand and contract. The varying mechanical force is coupled into the conduit through a means of intimate contact between the transducer and the conduit. These electro-mechanical transducers are substantially symmetrical in that they can be used to apply or extract a signal.

Because the electrical line wires are inside the conduit, the vibratory signal will travel farther along the wire than on the conduit, which is dampened by soil contact. The signal on the wire will also excite the conduit along its length for some distance, dependent upon frequency and amplitude of the signal. If there is a contact between the electric line wire conduit and the utility pipeline, the vibratory signal will transfer to the pipeline for detection by a suitable receiver connected with the pipeline, thereby confirming the contact.

In accordance with one embodiment of this invention, the direction of travel of the vibratory signal may be reversed. That is, the vibratory signal may be imparted onto the utility pipeline by an acoustic transmitter connected with the pipeline and a vibratory signal detector may be connected with the electric line wire conduit. Thus, if there is a contact between the electric line wire conduit and the utility pipeline, the vibratory signal will transfer from the utility pipeline to the electric line wire conduit for detection by the vibratory signal detector. While the range of this embodiment may be greater than the embodiment described herein above employing an electro-magnetic signal, the range is limited by the dampening effects of the soil surrounding the electric line wire conduit.

To provide yet a longer range for detection, in accordance with one embodiment of this invention, the vibratory signal is imparted directly onto one or more of the current carrying electric line wires by a suitable vibratory signal transmitter connected directly to the electric line wires, which are typically energized, which, in turn, will excite the current carrying wires and the conduit along its length. Because the current carrying electric line wires are disposed within the electric line wire conduit, the signal will travel further than a signal imparted onto the conduit. If there is a contact between the conduit and the pipeline, the signal should transfer from the conduit to the pipeline for detection by a suitable vibratory signal detector connected with the pipeline.

In accordance with one embodiment of this invention, the vibratory signal transferred to the pipeline is sufficiently strong so as to transfer into a pressurized gas stream in the pipeline. In this case, a vibratory signal receiver is disposed in the gas stream in the pipeline.

It will be appreciated by those skilled in the art that, when employing an acoustic signal, it is necessary to be able to distinguish the acoustic signal from background noise which may be present. This may be achieved by varying one or more of a number of characteristics associated with acoustic signals, including, but not limited to, frequency, pattern, power, and timing, thereby producing a distinct signal that is both stronger and distinguishable from any background noise on the utility pipeline and/or the electric line wire conduit due to natural vibration patterns, such as traffic, construction, and the like. For example, the signal may be in the form of a pulse, chirp, or continuous wave. In addition, these and other inputs may be tailored to extend the range of the signal depending on environmental variables, such as soil type and depth of burial.

As previously indicated, when the acoustic signal is imparted onto the electric line wire conduit, the electric line wires, or the utility pipeline, as the signal travels along the corresponding path, a portion of its acoustic energy propagates outward and into the surrounding soil. This attenuation is particularly problematic at higher acoustic frequencies. Although acoustic frequencies from about 1 Hz to about 20 kHz may be employed, in accordance with one embodiment of this invention, the frequency of the acoustic signal is preferably in the range of about 100 Hz to about 3 kHz, more preferably in the range of about 100 Hz to about 1000 Hz, and most preferably in the range of about 100 Hz to about 500 Hz.

However, it is anticipated that there may be circumstances in which signal attenuation is not an issue, in which case frequencies into the ultrasonic range, i.e. greater than 20 kHz, may be employed, and such frequencies are deemed to be within the scope of this invention.

The signal produced by the vibratory signal transmitter may be imparted onto the electric line wire conduit in either a torsional mode or a longitudinal mode. The torsional mode is generally preferable to the longitudinal mode because the transducer required is simpler and lighter. However, either mode may be employed in connection with gaseous fluid conducting utility pipelines. However, the longitudinal mode of transmission is generally considered not to be suitable for use in connection with liquid-filled utility conduits. Accordingly, in the case of liquid-filled utility pipelines, the torsional mode of transmission is preferred.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for detecting contact between an underground electric wire conduit and an underground utility pipeline comprising the steps of:
   imparting a detectable signal onto an electric line wire disposed within said underground electric wire conduit, wherein the detectable signal is a vibratory signal;
   monitoring said underground utility pipeline for a presence of said detectable signal; and
   detecting said detectable signal when there is a contact between said underground electric wire conduit and said underground utility pipeline.

2. The method of claim 1, wherein said vibratory signal is applied to said electric line wire by a sound generation means for generating said vibratory signal in contact with said underground electric wire conduit.

3. The method of claim 1, wherein said vibratory signal is applied to said electric line wire by sound generation means for generating said vibratory signal in contact with said electric line wire.

4. The method of claim 1, wherein said vibratory signal is detected by a vibratory signal detector connected with said underground utility pipeline.

5. The method of claim 1, wherein said vibratory signal is detected by a vibratory signal detector, disposed within said underground utility pipeline.

6. The method of claim 4, wherein said vibratory signal is detected by an additional vibratory signal detector disposed within said underground utility pipeline.

7. The method of claim 1, wherein said vibratory signal has a distinctive vibratory signature.

8. The method of claim 7, wherein said distinctive vibratory signal is produced by varying at least one of a frequency, pattern, power, or timing of said vibratory signal.

9. The method of claim 1, wherein a frequency of said vibratory signal is in a range of about 100 Hz to about 3 kHz.

10. The method of claim 1, wherein a frequency of said vibratory signal is in a range of about 100 Hz to about 1000 Hz.

11. The method of claim 1, wherein a frequency of said vibratory signal is in a range of about 100 Hz to about 500 Hz.

12. A system for detecting contact between an underground electric wire conduit and an underground utility pipeline comprising:
   electronic signal generation means comprising a sound generation means for generating a vibratory signal and imparting a detectable vibratory signal onto an electric line wire disposed within said underground electric wire conduit; and
   electronic signal detector means for electronically receiving and identifying said detectable vibratory signal at least one of connected with an exterior of said underground utility pipeline or disposed within said underground utility pipeline.

13. The system of claim 12, wherein said electronic signal detector means comprises a vibratory signal detector.

14. The system of claim 12, wherein said electronic signal generator means further comprises vibratory signature means for generating a distinctive vibratory signature.

15. The system of claim 14, wherein said vibratory signature means comprises at least one of frequency means for varying a frequency of said sound generation means, pattern means for generating a vibratory signal pattern, power means for varying a power level to said sound generation means, or timing means for varying a timing of said sound generation means.

* * * * *